United States Patent [19]

Chari

[11] 4,287,596

[45] Sep. 1, 1981

[54] DATA RECOVERY SYSTEM FOR USE WITH A HIGH SPEED SERIAL LINK BETWEEN TWO SUBSYSTEMS IN A DATA PROCESSING SYSTEM

[75] Inventor: Venu Chari, San Diego, Calif.

[73] Assignee: NCR Corporation, Dayton, Ohio

[21] Appl. No.: 98,019

[22] Filed: Nov. 26, 1979

[51] Int. Cl.³ .............................................. H04L 27/10
[52] U.S. Cl. ....................................... 375/49; 360/43; 375/52; 375/88; 375/95
[58] Field of Search .................... 329/107; 375/44, 45, 375/49, 55, 80, 82, 88, 95, 52; 360/42, 44, 43; 364/111, 112; 179/20 P; 370/12, 86

[56] References Cited

U.S. PATENT DOCUMENTS

| | | | |
|---|---|---|---|
| 3,377,560 | 4/1968 | Renshaw | 375/88 |
| 3,437,932 | 4/1969 | Malakoff | 375/49 |

Primary Examiner—Benedict V. Safourek
Attorney, Agent, or Firm—J. T. Cavender; Edward Dugas; Stephen F. Jewett

[57] ABSTRACT

A data recovery circuit for use in a data processing system where plural subsystems are linked by a bit serial transmission line. The data transmitted over the bit serial transmission line is in the form of a phase encoded (PE) pulse signal. The data recovery circuit includes a time delay circuit for delaying the PE pulse signal by a three-quarter bit period. The three-quarter bit period delay signal permits the generation of a control clock signal. The control clock signal is used in sampling the PE pulse signal at three-quarter bit period points in order to generate a control signal that indicates the absence or presence of a transition at the midpoint of each bit period of the PE pulse signal. The control signal is used to generate a recovered clock signal by logically combining the control signal with the PE pulse signal and a one-half bit period delayed PE pulse signal. The control signal is also used to generate a recovered data signal by clocking the control signal into two cascaded flip-flops and logically combining the outputs of the two cascaded flip-flops.

11 Claims, 7 Drawing Figures

DATA RECOVERY SYSTEM FOR USE WITH A HIGH SPEED SERIAL LINK BETWEEN TWO SUBSYSTEMS IN A DATA PROCESSING SYSTEM

BACKGROUND OF THE INVENTION

The present invention relates to data processing systems and, more particularly, to the transmission of data over a bit serial line or link between two subsystems of a data processing system.

Modern data processing systems are often comprised of a plurality of subsystems where each subsystem processes or generates data. For example, such systems may include one or more processing subsystems, disc subsystems, magnetic tape subsystems, and the like.

Because data processing and generating functions are spread over several subsystems, it is necessary for the subsystems to frequently communicate with each other. Since processors generally operate at high speeds, it is necessary that the transmission lines or links between the subsystems be capable of transferring data at a high speed comparable to the speed with which data is processed.

A number of approaches have been proposed in the past for providing high speed transmission lines between subsystems. One approach has been to provide a "common trunk", that is, a bus or plurality of transmission lines which carry data bits in parallel and which is connected to each subsystem. Common trunks are used in a number of current commercially available data processing systems, including, for example, the 8400 and 8500 series of data processing systems sold by NCR Corporation, Dayton, Ohio. The drawback to the use of the common trunk is, of course, that a large number of electrical conductors are required to provide the common trunk and, accordingly, it is expensive to manufacture. While the concept of transmitting data serially over a single transmission line or link has been known in the past, this approach has not been widely used for connecting subsystems within a single data processing system because of the high cost of the circuitry needed to serially receive and serially transmit the data at sufficiently high speeds to match the speed of the processors within the system.

Recently, there have been improvements in the cost and operating capability of integrated circuitry. For example, integrated circuits implemented in emitter coupled logic (ECL) can operate on data at much faster speeds than integrated circuits implemented in earlier logic families, and have a cost which is now comparable to the integrated circuits in earlier logic families. As a result, it is now feasible to use logic circuitry in conjunction with a bit serial link that can transmit data at speeds sufficiently high for use within data processing systems. Since these bit serial links use only one conductor line to transmit data and are, as a consequence, less expensive than common trunks, there has arisen the need for circuitry to transmit and receive the serial data at high speeds.

To transmit serial binary data over a transmission line normally requires that the data be somehow encoded. While encoding the binary data into analog signals is desirable for data transmission over long distances, because of the inherent greater immunity of analog signals to noise and interference, digital pulse encoding techniques are sufficient between data processing subsystems located within close proximity to each other.

A number of digital or binary encoding techniques have been employed in the past. These techniques include non-return to zero (NRZ) encoding, return to zero (RZ) encoding, phase encoding, and multilevel binary encoding. NRZ encoding is not suitable in many applications because it is not self-clocking, and accordingly, a separate clocking signal must be generated with the encoded data. RZ encoding likewise has disadvantages. While RZ does include some self-clocking features, the clock is sometimes very difficult to recover and accordingly, it is subject to some failure.

Multilevel binary encoding, on the other hand, is very reliable. However, it uses three or more voltage levels to transmit binary data and, as a consequence, requires extensive circuitry for converting between the binary data levels and the three voltage levels.

For the above reasons, phase encoding is perhaps the most ideally suited means of serially encoding binary or digital data in a data processing system. Phase encoded pulse signals use signal level transitions to carry both binary data and synchronization (clocking) information, and at least one signal level transition occurs during each bit period or interval. The various types of phase encoded pulse signals include the biphase-level code (also known as the Manchester code), the biphase-mark code (also known as the diphase code), and the biphase-space code. For a more detailed description of each of these binary pulse codes, reference can be had to a number of United States patents and printed publications including, for example, Fairchild Camera and Instrument Corporation, The Interface Handbook—Line Drivers and Receivers, Chapter 4 (1975).

A number of techniques have been used in the past for recovering data that has been encoded in phase encoded pulse codes. The recovering of the clocking or synchronization signal in the encoded data is one of the most vexing problems in the use of these codes, and phase locked oscillators are normally employed to aid in the recovery of the clocking signal. The disadvantage of phase locked oscillators is that they generally include extensive circuitry and are relatively expensive in cost. Furthermore, commercially available phase locked oscillators frequently have to be tuned so that they can operate with the specific frequency used in the code.

Techniques that have been used in recovering data are disclosed in U.S. Pat. No. 3,603,945, issued to Friedrich R. Hertrich, and U.S. Pat. No. 3,597,751, issued to Robert F. Neidecker and Friedrich R. Hertrich. The data recovery circuitry shown in each of these patents uses a delay circuit for delaying the read back signal from a magnetic recording apparatus, and combining the delayed read back signal with an undelayed read back signal. By detecting the amplitude of the combined signals, data can be recovered from the read back signal. The circuitry in both patents, however, is concerned with recovering data from a read back signal generated by magnetic fluxes on a magnetic medium that has the nature of an analog signal, rather than recovering the data from a signal that has the nature of binary pulses and that is transmitted over a bit serial link between two data processing subsystems.

SUMMARY OF THE INVENTION

There is provided in accordance with the present invention a data recovery system or circuit for use in a data processing system. The data recovery system provides for the recovery of both data and clock signals from a phase encoded pulse signal or code, without the use of a phase locked oscillator.

More specifically, there is provided in accordance with the present invention a data recovery system for recovering both data and clocking information from a phase encoded pulse signal that has a first signal level transition at the beginning of each bit period or interval in the signal. Each bit period includes a second signal level transition in order to represent one of two binary data values. A lack of the second transition represents the other of two binary data values. The data recovery system includes means for generating a control signal that indicates the presence or absence of the second transition of each bit period, with the control signal used to both generate the recovered clock signal and the recovered data signal.

The control signal is generated in accordance with the present invention by sampling the phase encoded pulse signal at each bit period of the signal, following the point in the bit period where the second transition would have occurred. Since there is a signal level transition at the beginning of each bit period, the sampling is made to occur at a predetermined period of time following the first transition. A time delay circuit is used to delay the phase encoded pulse signal so that the transition at the beginning of each bit period of the delayed signal is used at some point in time determined by the time delay circuit to sample the undelayed phase encoded pulse signal.

In the preferred embodiment, there is disclosed a data recovery system for recovering data and clocking signals or information from a phase encoded pulse signal of the biphase-space type. That is, the phase encoded pulse signal has a first transition at the beginning of each bit period in the signal. In order for each bit period of the phase encoded pulse signal to represent a binary bit having either of two values, there is, at the middle of each bit period, the presence of a second transition for indicating a "0" logic level signal and the absence of the second transition to indicate a "1" logic level signal. The phase encoded pulse signal is sampled during each bit period at the three-quarter bit period point.

In order to generate a control signal in the data recovery system of the preferred embodiment, a time delay circuit is used to delay the phase encoded pulse signal by a period equal to three-fourths of the bit period of the phase encoded pulse signal. The delayed phase encoded pulse signal is provided to an Exclusive OR gate, which at its output provides a control clock signal. The control clock signal clocks a flip-flop in order to sample the undelayed phase encoded pulse signal. The output of the flip-flop is the control signal, and it is, among other things, fed back to the Exclusive OR gate along with the three-quarter bit time delayed phase encoded pulse signal.

The control signal is used to both generate the recovered clock signal and the recovered data signal. The control signal is provided to logic circuitry along with a one-half bit time delayed phase encoded pulse signal and the undelayed phase encoded pulse signal. The logic circuitry includes first and second logic gates for logically combining the signals, and a third logic gate for logically combining the outputs of the first and second logic gates in order to provide the recovered clock signal. In addition, the control signal is clocked into first and second cascaded flip-flops by the recovered clock signal in order to generate the recovered data signal.

It is, therefore, an object of the present invention to provide an improved data processing system.

It is another object of the present invention to provide an inexpensive and simple data recovery system for recovering data from a bit serial line in a data processing system.

It is still another object of the present invention to provide a data processing system having plural subsystems linked by bit serial transmission lines, wherein the data on the transmission line is recovered without the use of a phase locked oscillator.

It is still another object of the present invention to provide a data recovery system for use in a data processing system where data is transmitted over a bit serial link in a phase encoded pulse code.

These and other objects of the present invention will become more apparent when taken in conjunction with the following description and the attached drawings.

DETAILED DESCRIPTION OF THE PREFERRED EMBODIMENT

Figure 1:
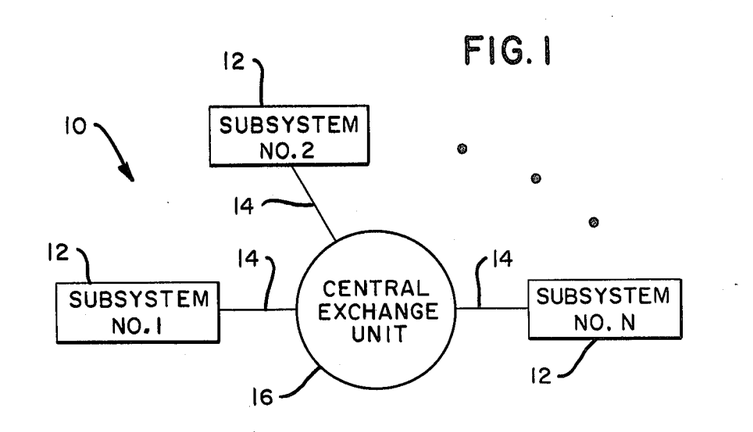
FIG. 1 is a simplified block diagram of a data processing system having a plurality of subsystems linked by bit serial transmission lines.

Turning now to FIG. 1, there is shown a data processing system 10 that has a plurality of subsystems 12. The subsystems 12 are numbered 1 through N, and can include one or more processors, disc units, magnetic tape units, card readers, and the like. As in any data processing system, data is transmitted between the subsystems 12, and in FIG. 1 there is shown a bit serial transmission line or link 14 connecting each subsystem to a central exchange unit 16. The central exchange unit 16 receives data signals from any one of the subsystems 12 over one of the transmission lines 14, and directs the data signal to one of the transmission lines 14 going to another subsystem in the data processing system 10. The construction of the central exchange 16 and the content of the messages or data transmitted over each of the bit serial transmission lines 14 is not within the scope of the present invention, and accordingly is not described in any detail herein. Details of a central exchange can be found, for example, in U.S. Pat. No. 3,638,198, issued to Edward Balogh, Jr., or U.S. Pat. No. 3,510,844, issued to Steven F. Aranyi, et al. A general discussion of the protocol that could be used in organizing the content of the data signals over the transmission lines 14 can be found, for example, in A. J. Weissberger, Data Communications Handbook, Signetics Corporation (1977).

The data transmitted over the serial transmission lines 14 is encoded into a pulse code that has both data and clocking information. Since it is envisioned that each of the subsystems 12 is located in close proximity to the other subsystems 12, rather than at great distances apart as would be the case with long distance communications between complete systems, analog signals involving the use of modems and other equipment are not used. Rather, the signals between each of the subsystems 12 will have the form of binary pulses, and it is necessary that each station be capable of encoding data into a suitable binary pulse code for transmission over the transmission lines 14, and be capable of recovering data from the binary pulse code received from the transmission lines 14.

In the preferred embodiment, a phase encoded (PE) pulse code or signal, specifically, a biphase-space code, is used in transmitting the data. Circuitry for taking serial data and encoding the data and a clock signal into the biphase-space code is well-known in the art and, accordingly, no description of such circuitry is given herein.

In order to recover the data from the PE pulse signal, there is needed a data recovery circuit that can recover both the data signal and the clock signal from the PE pulse signal. A data recovery circuit 20, shown in FIG. 2, could be used in each of the subsystems 12 of FIG. 1 to accomplish the recovery of the data and clock signals.

Figure 2:
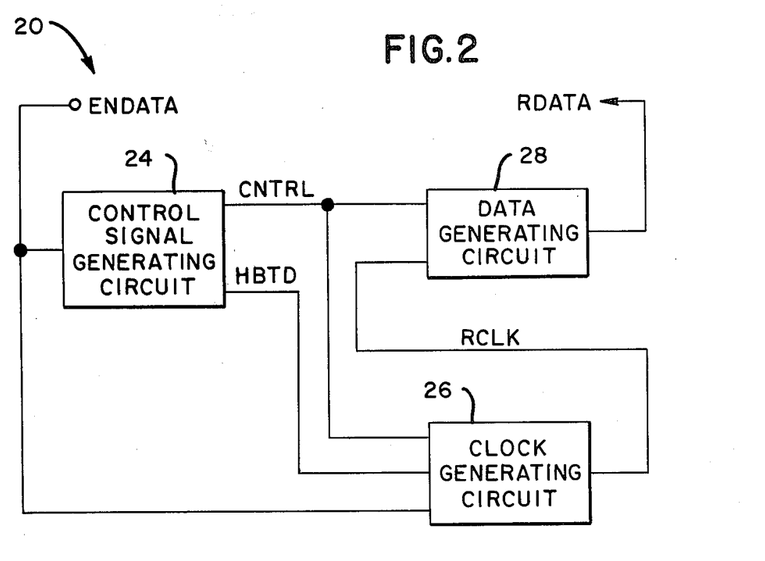
FIG. 2 is a simplified block diagram of a data recovery circuit for use in the data processing system of FIG. 1, such data recovery circuit being made in accordance with the present invention.

As shown in FIG. 2, the data recovery circuit 20 includes a control signal generating circuit 24, a clock generating circuit 26, and a data generating circuit 28. As will be described in greater detail later, the control signal generating circuit 24 receives the PE pulse signal (ENDATA) from one of the bit serial transmission lines 14 and generates a control signal (CNTRL). As is well-known in the art, a PE pulse code has at least one signal level transition per bit period, and uses the signal level transitions in each bit period to represent either one of two binary values. The CNTRL signal at the output of the circuit 24 indicates the presence or absence of a transition during the bit period of the PE code that would represent one of the two binary values.

The CNTRL signal is provided to a clock generating circuit 26 along with a signal HBTD, which is the PE pulse signal received from the transmission line 14, delayed by a one-half bit period time delay. In addition, the clock generating circuit 26 receives the undelayed PE pulse code from transmission line 14 and logically combines the three signals, in a manner to be described in greater detail later, in order to generate a clock signal (RCLK) associated with the data information in the PE pulse code. The RCLK signal is provided to the data generating circuit 28 along with the CNTRL signal to provide the recovered data (RDATA) at the output of the data generating circuit 28.

Figure 3A:
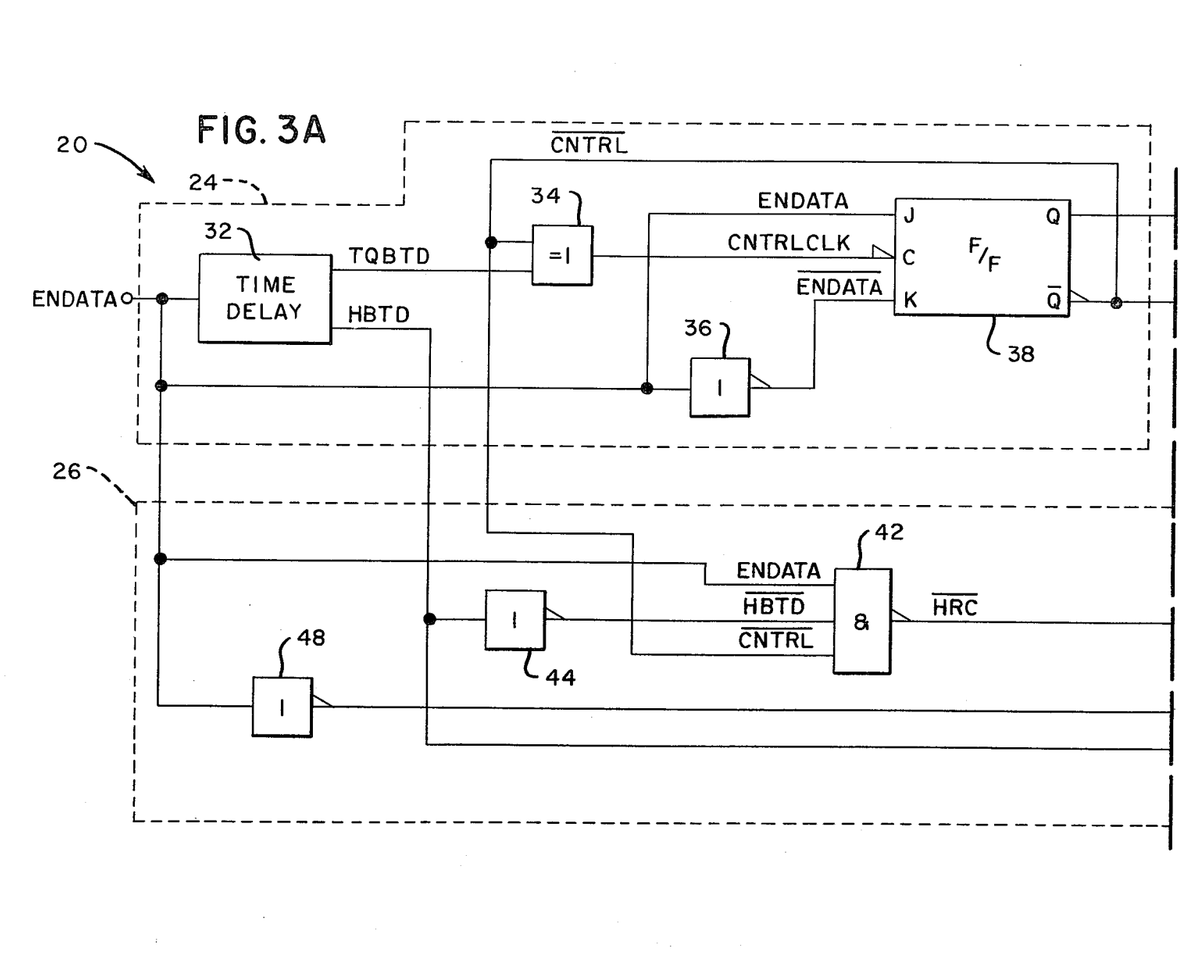
FIGS. 3A and 3B are a detailed circuit diagram of the data recovery circuit shown in FIG. 2.
Figure 3B:
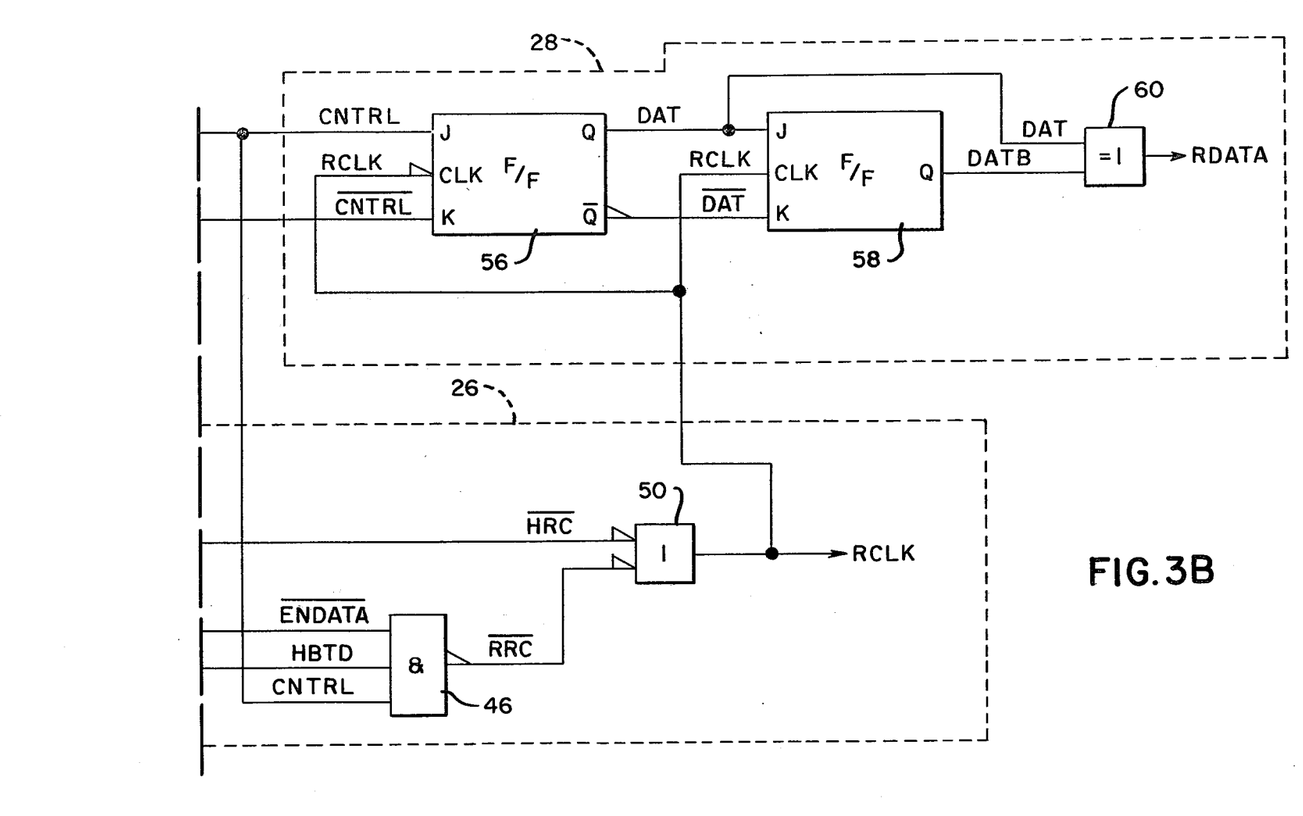
Figure 4A:
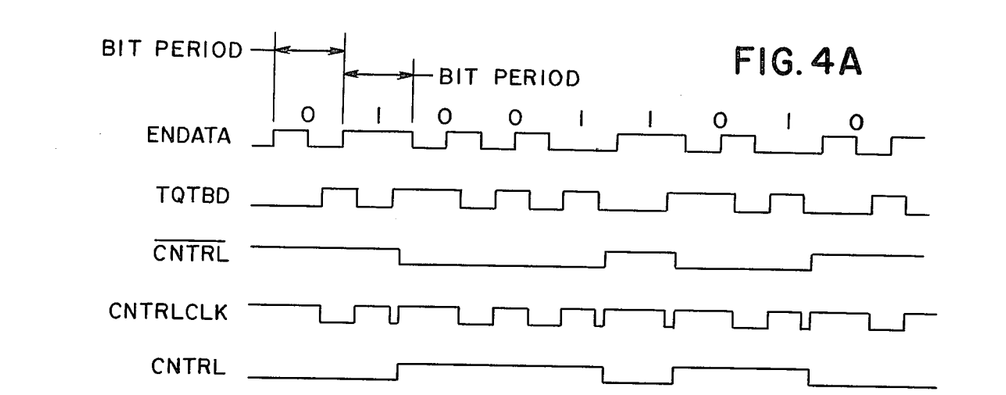
FIGS. 4A, 4B and 4C are waveform diagrams illustrating the operation of the data recovery circuit shown in FIG. 2 and in FIGS. 3A and 3B.
Figure 4B:
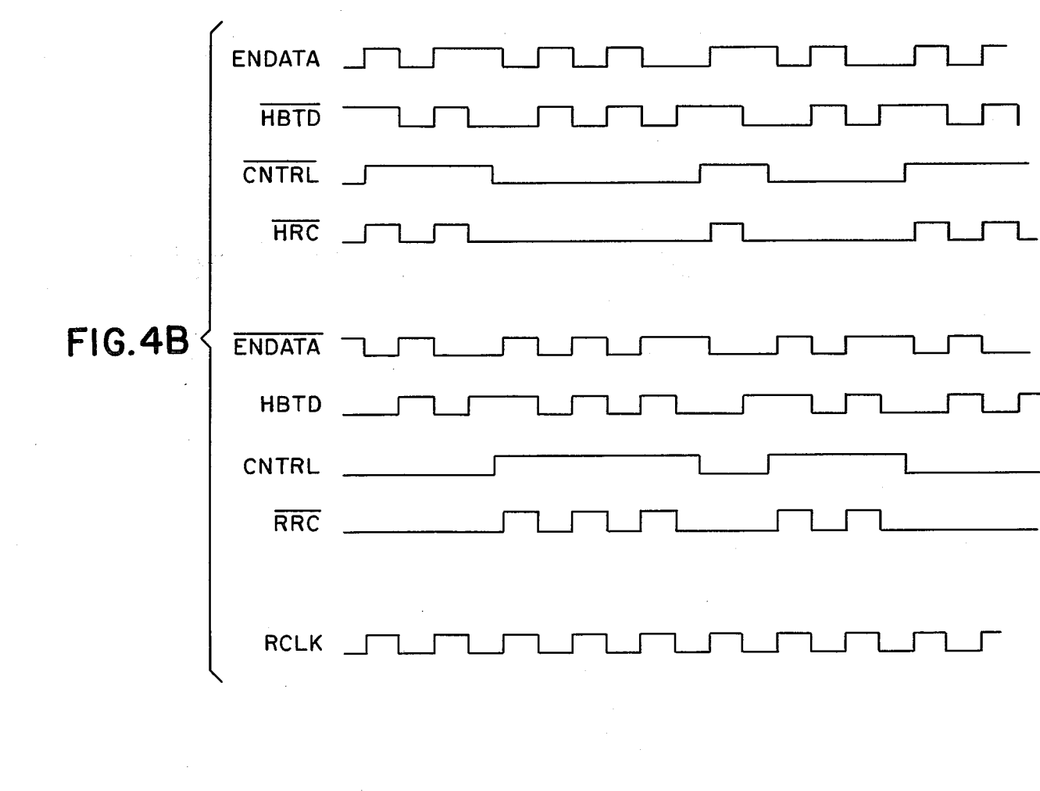
Figure 4C:
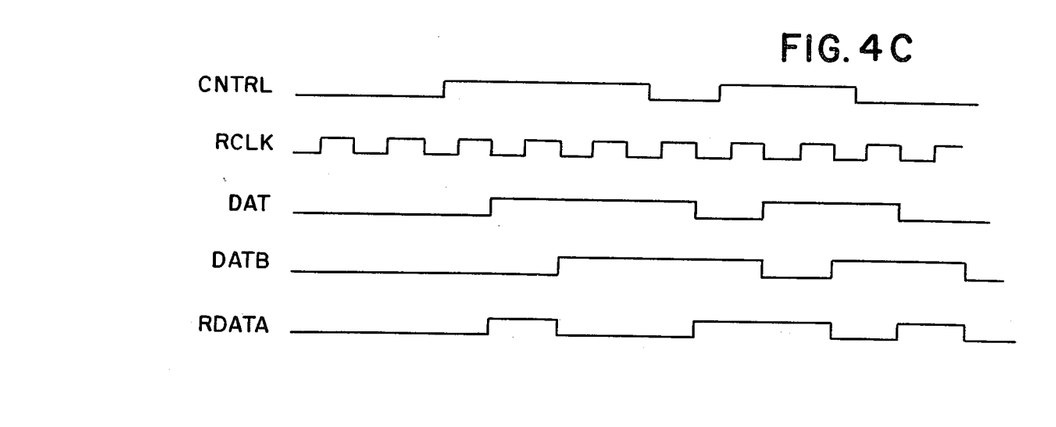

FIGS. 3A and 3B show in greater detail the circuitry within the data recovery circuit 20, and FIGS. 4A, 4B and 4C show waveforms of various signals within the data recovery circuit 20 in order to illustrate its operation.

Turning first briefly to FIG. 4A, the PE pulse signal (ENDATA) received by the data recovery circuit is, as mentioned earlier, a biphase-space code and, accordingly, is shown as having a signal level transition at the beginning of each bit period. Furthermore, as shown in FIG. 4A, ENDATA has a second transition at the midpoint of each bit period where a logic "0" is represented, and has no transition at the midpoint of each bit period where a logic "1" is represented.

The ENDATA signal is provided to a time delay circuit 32 (FIG. 3A) in the control signal generating circuit 20. The time delay circuit 32 is a commercially available device, such as an active fifty nanosecond, five-tap delay module (PE 21385) sold by Pulse Engineering, Inc., Studio City, Calif. The circuit 20 further includes an Exclusive OR gate 34, an inverter 36, and a JK flip-flop 38.

The time delay circuit 32 receives the ENDATA signal and in turn provides at its output a signal TQBTD, which represents the ENDATA signal delayed by three-fourths of a bit period, and the previously mentioned one-half bit period delayed signal HBDT. The TQBTD signal is provided to one input of the Exclusive OR gate 34, which provides at its output a control clock signal (CNTRLCLK) to the clock input of the flip-flop 38. The ENDATA signal is provided directly to the J input and is provided by way of inverter 36 to the K input of the flip-flop 38 so that the CNTRLCLK signal clocks the ENDATA signal into the flip-flop at each three-quarter bit period point of the ENDATA signal. The output of the flip-flop 38 is the CNTRL signal, and the inverted control signal ($\overline{\text{CNTRL}}$) at the inverted output of flip-flop 38 is provided to the second input of the Exclusive OR gate 34.

The nature of the signals generated in the control signal generating circuit 24 is illustrated by the waveforms in FIG. 4A. It can be seen in FIG. 4A that the CNTRLCLK signal resulting from the Exclusive ORing of the TQBTD signal and the $\overline{\text{CNTRL}}$ signal has a falling edge corresponding to each three-quarter bit period point of the ENDATA signal. The falling edge of the CNTRLCLK signal clocks flip-flop 38, and consequently, the ENDATA signal is sampled at three-quarter bit period points in order to provide the CNTRL signal. As can be further seen, the CNTRL signal has a signal level transition each time there is a lack of a transition at the midpoint of each bit period in the ENDATA signal. Since the lack of a transition in the ENDATA signal indicates a binary "1", each transition of the CNTRL signal indicates a binary "1."

It should be noted that the Exclusive OR gate 34 assures that the same edge of the clock signal CNTRLCLK occurs at each three-quarter bit point of the ENDATA signal. That is, the Exclusive ORing of CNTRL and TQBTD cause a falling edge to occur at each three-quarter bit period point of the ENDATA signal, whereas the Exclusive ORing of CNTRL and TQBTD (if it were desired) would cause a rising edge of the CNTRLCLK signal to appear at each three-quarter bit period point of the ENDATA signal. It should further be noted that the presence of a transition or edge in the CNTRLCLK signal at each three-quarter bit period point is due to the transition at the beginning of each bit period in the ENDATA signal and the three-quarter delay in the time delay circuit 32. The resulting TQBTD signal has a transition at the beginning of each bit period, causing the falling edge of the CNTRLCLK signal.

The control signal (CNTRL) is delivered both to the clock generating circuit 26 (FIGS. 3A and 3B) and the data generating circuit 28 (FIG. 3B). The clock generating circuit 26 includes a NAND gate 42 for receiving the ENDATA signal, an inverted one-half bit time delayed PE pulse signal ($\overline{\text{HBTD}}$) by way of an inverter 44, and the inverted control signal ($\overline{\text{CNTRL}}$), and provides at its output a signal $\overline{\text{HRC}}$. A second NAND gate 46 in the clock generating circuit 26 receives an inverted PE pulse signal ($\overline{\text{ENDATA}}$) by way of an inverter 48, the HBTD signal from the time delay circuit 32, and the CNTRL signal, and provides at its output a signal $\overline{\text{RRC}}$. The $\overline{\text{HRC}}$ and $\overline{\text{RRC}}$ signals are provided to the inputs of a NAND gate 50, which provides a recovered clock signal RCLK.

The nature of the signals in the clock generating circuit 26 is illustrated in FIG. 4B. As can be seen in FIG. 4B, the ENDATA signal, having a signal transition at the beginning of each bit period, permits the generation of a clock signal RCLK having a transition at both the beginning and midpoint of each bit period by the logical combination of the ENDATA, $\overline{\text{HBTD}}$, $\overline{\text{ENDATA}}$, and HBTD signals. The provision of the CNTRL and $\overline{\text{CNTRL}}$ signals at the inputs to logic gates 42 and 46 controls the logical combination of the ENDATA, $\overline{\text{HBTD}}$, $\overline{\text{ENDATA}}$ and HBTD signals so that the complete clock signal RCLK is generated. When CNTRL is low ($\overline{\text{CNTRL}}$ is high), $\overline{\text{HRC}}$ provides the signal to generate RCLK, and when CNTRL is high ($\overline{\text{CNTRL}}$ is low), $\overline{\text{RRC}}$ provides the signal to generate RCLK.

The recovered clock signal RCLK is provided to the data generating circuit 28, which is shown in FIG. 3B as having cascaded flip-flops 56 and 58. The flip-flop 56 receives the CNTRL and $\overline{\text{CNTRL}}$ signals at its J and K inputs, and the DAT and $\overline{\text{DAT}}$ signals at its inverted and noninverted outputs, respectively, are provided to the J and K inputs of the flip-flop 58. The output signal DAT of flip-flop 56 and the output signal DATB of flip-flop 58 are provided to an Exclusive OR gate 60, which provides at its output the recovered data signal RDATA.

The nature of the signals in the data generating circuit 28 are illustrated in FIG. 4C. It can be seen in FIG. 4C that by successively clocking the CNTRL signal through the cascaded flip-flops 56 and 58 by the falling edge of the RCLK signal, and then logically combining the outputs of the two flip-flops at the Exclusive OR gate 60, the RDATA signal is generated.

It can be seen from the above that the data recovery circuit 20 provides simple circuitry for recovering the clock and data signals from a self-clocking PE pulse signal (ENDATA), without the use of a phase locked oscillator. By using a three-quarter bit time delay of the PE pulse signal (TQBTD), the PE pulse signal is sampled during each bit period at a point following the point where a transition would have occurred to indicate one of two binary data levels. The resulting control signal (CNTRL) is used to both generate a recovered clock signal (RCLK), by combining the PE pulse signal with a one-half bit time delayed PE pulse signal (HBTD), and to generate a recovered data signal (RDATA), by clocking the control signal into cascaded flip-flops using the recovered clock signal.

Of course, phase encoded pulse signals other than the biphase-space code of the preferred embodiment could be used in the practice of the present invention.

Although the presently preferred embodiment of this invention has been described, it will be understood that within the purview of this invention various changes may be made within the scope of the appended claims.

I claim:
1. A data processing system, comprising:
at least two subsystems;
a bit serial line for transmitting data between said two subsystems;
a data encoder at each subsystem for encoding the data into a signal having the form of phase encoded pulses, with a first transition at the beginning of each bit period of the phase encoded pulses, a second transition before the next bit period in order to indicate one of two data values, and a lack of the second transition before the next bit period in order to indicate the other of two data values; and
a data recovery circuit at each subsystem for receiving the phase encoded pulses from the bit serial line and decoding the phase encoded pulses to recover the data, said data recovery circuit including means for sampling the phase encoded pulses at a point after the midpoint of each bit period but before the end of that bit period and storing the sampled signal, so that the sampled signal has a transition indicating whether there is a second transition during each bit period of the phase encoded pulses;
said means for sampling including means for delaying the phase encoded pulses by a period between a one-half bit period and a bit period, so that the delayed signal has a transition occurring between the midpoint and end of each bit period of the phase encoded pulses and can be used to sample the phase encoded pulses.

2. The data processing system of claim 1, wherein the phase encoded pulses are in the form of a biphase-space code and wherein the sampled signal has a transition where the phase encoded pulses have no second transition during each bit period of the phase encoded pulses.

3. The data processing system of claim 1, wherein the second transition occurs at the midpoint of the bit period, wherein said means for delaying includes a time delay circuit for delaying the phase encoded pulses by a three-quarter bit period and wherein said means for sampling further includes:
a flip-flop for storing and providing the sampled signal, said flip-flop having an input for receiving the phase encoded pulses, a clock input, and an inverted output for providing an inverted sampled signal; and
an Exclusive OR gate for receiving the three-quarter bit delayed signal from the time delay circuit and the signal at the inverted output of said flip-flop, and providing its output to the clock input of said flip-flop.

4. The data processing system of claim 1, wherein said means for sampling further includes half bit time delay means for delaying the phase encoded pulses by a one-half bit period time delay and wherein said data recovery circuit further includes a recovered clock generating circuit for receiving the phase encoded pulses, the sampled signal from the means for sampling, and the one-half bit period delayed signal, and in response generating a recovered clock signal from the phase encoded pulses.

5. The data processing system of claim 4, wherein the data recovery circuit further includes a recovered data generating circuit for generating a signal representing the data recovered from the phase encoded pulses, said recovered data generating circuit including:
a first flip-flop having a data input for receiving the sampled signal, a clock input for receiving the recovered clock signal, and an output;
a second flip-flop having an input connected for receiving the signal at the output of said first flip-flop, a clock input for receiving the recovered clock signal, and an output; and
an Exclusive OR gate for receiving the signals at the output of said first and second flip-flops and providing the recovered data signal.

6. The data processing system of claim 4, wherein said means for sampling further includes means providing an inverted sampled signal and wherein said recovered clock generating circuit includes:
  means for inverting the one-half bit period delayed signal;
  means for inverting the phase encoded pulses;
  first logic gate means for receiving and logically combining the phase encoded pulses, the inverted one-half bit period delayed signal, and the inverted sampled signal;
  second logic gate means for receiving and logically combining the inverted phase encoded pulses, the one-half bit time delay signal and the sampled signal; and
  third logic gate means for receiving and logically combining the outputs of said first and second logic gate means to provide the recovered clock signal.

7. In a data processing system having a plurality of subsystems and a bit serial transmission line for transmitting serial data between said plurality of subsystems, the improvement comprising:
  encoding means at each of said stations for encoding the serial data into phase encoded pulses for transmission over said bit serial transmission line, the phase encoded pulses having at least a first transition during each bit period of the phase encoded pulses and having a second transition during each bit period to represent one of two data values; and
  data recovery means at each of said stations for recovering the data from the phase encoded pulses, said data recovering means including:
  means for generating a control signal having a transition for indicating the presence or absence of the second transition during each bit period of the phase encoded pulse, said means for generating including means for delaying the phase encoded pulses by a period greater than the period during each bit period after which the second transition would have occurred, means for receiving the delayed phase encoded pulses and the control signal fed back from the output of said means for generating in order to generate a control clock signal, and means for sampling the phase encoded pulses in response to the control clock signal in order to provide the control signal;
  means for generating a clock signal recovered from the phase encoded pulses, including means for delaying the phase encoded pulses by one-half bit period and logic circuitry for receiving the control signal, the phase encoded pulses and the one-half bit period delayed signal, and providing in response thereto the recovered clock signal; and
  means for generating a data signal recovered from the phase encoded pulses, including cascaded two-state device means for receiving the control signal and being clocked by the recovered clock signal in order to provide the recovered data signal.

8. The data processing system of claim 7, wherein said means for sampling includes a flip-flop having a data input for receiving the phase encoded pulses, a clock input for receiving the control clock signal, and a data output for providing the control signal.

9. In a data processing system having a plurality of subsystems linked by a bit serial transmission line, a data recovery system for recovering a data signal and a clock signal from a phase encoded pulse signal transmitted over the bit serial transmission line, the improvement wherein said data recovery system comprises:
  means for generating a three-quarter bit period time delayed phase encoded pulse signal from the phase encoded pulse signal;
  means for receiving the three-quarter bit time delayed signal and generating a control clock signal having a transition at three-quarter bit period points of the phase encoded pulse signal;
  means for sampling the phase encoded pulse signal at three-quarter bit period points in response to the control clock signal;
  means for generating a one-half bit period time delayed phase encoded pulse signal from the phase encoded pulse signal;
  means for generating a recovered clock signal from the phase encoded pulse signal by logically combining the phase encoded pulse signal, the one-half bit period time delayed signal, and the control signal; and
  means for generating a recovered data signal from said phase encoded pulse signal, including cascaded flip-flop means receiving the control signal and clocked by the recovered clock signal and Exclusive OR gate means for logically combining the outputs of said cascaded flip-flop means in order to provide the recovered data signal.

10. In a data processing system having a plurality of closely located subsystems and a bit serial transmission line for transmitting data between each of the subsystems, the improvement comprising:
  a data encoder at each subsystem for encoding the data into a phase encoded pulse signal having at least one transition during each bit period, the phase encoded pulse signal having a second transition during each bit period in order to represent a first of two binary data values and a lack of the second transition in order to indicate the second of two binary data values; and
  a data recovery circuit at each subsystem for receiving the phase encoded pulse signal from the bit serial transmission line and recovering the data from the phase encoded pulse signal, including means for delaying the phase encoded pulses by a period greater than the period during each bit period after which the second transition would have occurred and flip-flop means for sampling the phase encoded pulse signal in response to the delayed phase encoded pulses so that the phase encoded pulses are sampled during each period following the point at which the second transition would have occurred so that a transition at the output of said flip-flop means indicates the second transition of each bit period of the phase encoded pulse signal.

11. In a data recovery circuit for recovering data from a signal in the form of encoded pulses, with a first transition during each bit period of the encoded pulses, a second transition at a predetermined time after the first transition and before the next bit period in order to indicate one of two data values, and a lack of the second transition before the next bit period in order to indicate the other of two data values, the improvement comprising:
  sampling means for sampling the encoded pulses at a point after said predetermined time of each bit period but before the end of that bit period to provide a sampled signal having a transition indicating whether there is a second transition during each bit period of the encoded pulses;

said means for sampling including means for delaying the encoded pulses by a period greater than the period during each bit period after which the second transition would have occurred, so that the delayed signal has a transition occurring after the predetermined time of each bit period of the encoded pulses and can be used to sample the encoded pulses.

* * * * *